United States Patent
Tsutsui et al.

(10) Patent No.: US 7,941,832 B2
(45) Date of Patent: May 10, 2011

(54) AUTHENTICATION DEVICE, AUTHENTICATION SYSTEM, AND VERIFICATION METHOD FOR AUTHENTICATION DEVICE

(75) Inventors: Tatsumi Tsutsui, Owariasahi (JP); Mitsutoshi Himaga, Owariasahi (JP); Tsukasa Yasue, Nagakute (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 1026 days.

(21) Appl. No.: 11/802,091

(22) Filed: May 18, 2007

(65) Prior Publication Data

US 2007/0300293 A1 Dec. 27, 2007

(30) Foreign Application Priority Data

May 19, 2006 (JP) ................................. 2006-139722

(51) Int. Cl.
*G06F 7/04* (2006.01)
(52) U.S. Cl. ............................................... 726/5; 728/4
(58) Field of Classification Search .................... 726/4, 5
See application file for complete search history.

(56) References Cited

U.S. PATENT DOCUMENTS

| 6,957,349 B1 | 10/2005 | Yasukura |
| 7,158,637 B2 * | 1/2007 | Ohta et al. ...................... 380/37 |
| 7,273,170 B2 | 9/2007 | Katsumata et al. |
| 7,650,499 B2 * | 1/2010 | Ittogi ............................ 713/161 |
| 2003/0070077 A1 | 4/2003 | Redlich et al. |
| 2003/0188153 A1 * | 10/2003 | Demoff et al. ................ 713/153 |
| 2005/0240749 A1 | 10/2005 | Clemo et al. |

FOREIGN PATENT DOCUMENTS

| CN | 1334951 | 2/2002 |
| CN | 1737723 | 2/2006 |
| JP | 9-282506 | 10/1997 |
| TW | I231899 | 5/2005 |

OTHER PUBLICATIONS

European Search Report issued in Patent Application No. 07009965. 0-2212 / 1857955 dated on Oct. 23, 2008.

* cited by examiner

*Primary Examiner* — Kambiz Zand
*Assistant Examiner* — Amare Tabor
(74) *Attorney, Agent, or Firm* — McDermott Will & Emery LLP

(57) ABSTRACT

At startup, divided data blocks are received from other authentication devices and are assembled together with the local divided data block to reconstitute first authentication data. After a prescribed time interval, divided data blocks are again received from other authentication devices and are assembled together with the local divided data block to reconstitute second authentication data. The first authentication data and the second authentication data are cross-checked, and the legitimacy of the other authentication devices is decided; in the event that the other authentication devices are legitimate devices, one authentication device among the multiplicity of authentication devices re-divides the second authentication data into a multiplicity of divided data blocks for re-distribution, and a process of reconstituting the authentication data from the divided data, cross-checking the reconstituted data with the first authentication data, and deciding whether the other authentication devices are legitimate devices is repeated at prescribed intervals.

4 Claims, 8 Drawing Sheets

Fig.3

| DIVIDED DATA DISTRIBUTION MANAGEMENT INFORMATION FILE ||
|---|---|
| DISTRIBUTOR DEVICE NUMBER | 100 |

| | |
|---|---|
| AUTHENTICATION DEVICE 100 DISTRIBUTION STATUS | COMPLETED |
| AUTHENTICATION DEVICE 200 DISTRIBUTION STATUS | COMPLETED |
| AUTHENTICATION DEVICE 300 DISTRIBUTION STATUS | COMPLETED |
| AUTHENTICATION DEVICE 400 DISTRIBUTION STATUS | COMPLETED |

| | |
|---|---|
| AUTHENTICATION DEVICE 100 ASSEMBLY STATUS | COMPLETED |
| AUTHENTICATION DEVICE 200 ASSEMBLY STATUS | COMPLETED |
| AUTHENTICATION DEVICE 300 ASSEMBLY STATUS | COMPLETED |
| AUTHENTICATION DEVICE 400 ASSEMBLY STATUS | NOT COMPLETED | ures
AUTHENTICATION DEVICE, AUTHENTICATION SYSTEM, AND VERIFICATION METHOD FOR AUTHENTICATION DEVICE

CROSS REFERENCE TO RELATED APPLICATIONS

The present invention claims priority from Japanese Application JP2006-139722 filed on May 19, 2006, the content of which is hereby incorporated by reference into this application.

BACKGROUND OF INVENTION

1. Technical Field

The present invention relates to an authentication system composed of a multiplicity of authentication devices.

2. Description of the Related Art

In the past, in order to confirm whether an unauthorized device is not connected to the system, in an authentication system composed of a multiplicity of authentication devices, each of authentication devices created a session key each other and authenticated other authentication devices each other to confirm whether no unauthorized device is connected.

However, with the prior art there is the risk that if the session key is analyzed and the authentication device is replaced by an unauthorized authentication device that can generate the session key, it will not be possible to detect the replacement by an unauthorized authentication device.

Also, while the authentication device will not start up until authentication by means of a session key is finished, since the authentication data per se is stored in the authentication device, if the authentication device were analyzed, the authentication data could be analyzed as well. As a result, there is a risk that authentication data is forged and an unauthorized authentication is executed.

SUMMARY OF THE INVENTION

In order to address the above problems at least in part, it is therefore an object of the present invention to detect instances in which an authentication device has been switched, or to make it difficult to analyze authentication data, in order to deter or prevent authentication by unauthorized means.

To address the problem, the authentication device in accordance with the present invention is an authentication device in an authentication system including a multiplicity of authentication devices, the authentication device comprising a nonvolatile memory configured to store one of a multiplicity of divided data blocks obtained by dividing into multiple blocks authentication data that has been prepared in advance, for the purpose of executing authentication through cross-checking against input data input to the authentication device; a receiver configured to receive a divided data stored in another authentication device; reconstituting module that assembles the divided data stored in the nonvolatile memory to the received divided data block and reconstituting the authentication data; a volatile memory configured to store the reconstituted authentication data; and authentication module that authenticates by cross-checking the reconstituted authentication data with the input data input to the authentication device at the time of authentication.

According to the authentication device which pertains to the present invention, even if the divided data block of one authentication device is successfully analyzed, since the divided data block constitutes only one of a multiplicity of divided data blocks into which the authentication data has been divided, analysis of the authentication data can be prevented. As a result it is possible to deter or prevent authentication by unauthorized means.

The authentication device pertaining to the present invention may further comprise a cross-checking module that cross-checks first authentication data reconstituted by the reconstituting module during a first time period and stored in the nonvolatile memory, against second authentication data reconstituted by the reconstituting portion during a second time period subsequent to the first time period; and an alarm configured to issue an alert of a problem in the event that the first authentication data and the second authentication data do not match.

According to the authentication device which pertains to the present invention, authentication data is used for mutual verification between devices, while cross-checking authentication data at two different time periods. In the event that an authentication device has been replaced between the two periods, the authentication device cannot be verified as being the same so it will be possible to detect that the authentication device has been replaced. It is accordingly possible to deter or prevent authentication by unauthorized means.

In the authentication device which pertains to the present invention, the prescribed first time period is the time of startup of the authentication device. According to the authentication device which pertains to the present invention, by using the time of startup as the first time period, replacement of the authentication device can be detected from the time of startup. It is accordingly possible to deter or prevent unauthorized authentication by replacement of an authentication device from the time of startup.

The authentication device pertaining to the present invention may further comprise dividing module that re-divides the reconstituted authentication data into divided data blocks different from the divided data blocks prior to reconstitution; and a distributor portion configured to distribute the re-divided data blocks to other authentication devices. According to the authentication device which pertains to the present invention, different divided data blocks are distributed each time, whereby if divided data blocks at some time are stolen or intercepted when the authentication data is subsequently re-divided and redistributed, the authentication device storing the stolen or intercepted divided data blocks will not be recognized as a legitimate device. Consequently, even if divided data blocks are stolen or intercepted, it is nevertheless possible to detect replacement of the authentication device and to deter or prevent authentication by unauthorized means.

The authentication device pertaining to the present invention may further comprise division/distribution device designating module that designate another authentication device from among a multiplicity of other authentication devices, to be assigned the task of dividing authentication data and distributing the divided data blocks; and a transmitter configured to transmit to other authentication devices a code indicating the designated authentication device. According to the authentication device which pertains to the present invention, from among a multiplicity of authentication devices the authentication device designates a division/distribution device assigned to carry out the task of dividing authentication data and distributing the divided data blocks, and thus the division/distribution device will be different each time. This makes it extremely difficult to target the division/distribution device for hacking. As a result it is difficult to analyze the authentication data, making it possible to deter or prevent authentication by unauthorized means.

The authentication system pertaining to the present invention is an authentication system including a multiplicity of authentication devices, wherein each authentication device comprises a nonvolatile memory configured to store one of a multiplicity of divided data blocks obtained by dividing into multiple blocks authentication data which has been prepared in advance for the purpose of executing authentication through cross-checking against input data input to the authentication device; a receiver configured to receive a divided data block stored in another authentication device; reconstituting module that assembles the divided data block stored in the nonvolatile memory to the received divided data block and reconstituting the authentication data; a volatile memory configured to store the reconstituted authentication data; authentication module that authenticates by cross-checking the input data at the time of authentication against the authentication data stored in the volatile memory; cross-checking module that cross-checks first authentication data reconstituted by the reconstituting module during a first time period and stored in the nonvolatile memory against second authentication data reconstituted by the reconstituting module during a second time period subsequent to the first time period; and alarm configured to issue an alert of a problem in the event that the first authentication data and the second authentication data do not match; and wherein one of the multiplicity of authentication devices further comprises dividing module that divides the reconstituted authentication data into divided data blocks different from the received divided data blocks; a distributor configured to distribute the divided data blocks so divided to other authentication devices; division/distribution device designating module that designates another authentication device from among a multiplicity of other authentication devices, to be assigned the task of dividing authentication data and distributing the divided data blocks; and a transmitter configured to transmit to other authentication devices a code indicating the designated authentication device.

According to the authentication system which pertains to the present invention, even if the divided data block of one authentication device is successfully analyzed, since the divided data block constitutes only one of a multiplicity of divided data blocks into which the authentication data has been divided, analysis of the authentication data can be prevented. As a result it is possible to deter or prevent authentication by unauthorized means.

The method for operating the authentication system which pertains to the present invention is a device verification method for use in an authentication device, comprising at startup, receiving a multiplicity of divided data blocks stored in the nonvolatile memory of another authentication device; assembling the divided data blocks stored in a local nonvolatile memory with the received divided data blocks to reconstitute first authentication data; storing the reconstituted first authentication data in the nonvolatile memory; after a prescribed time interval has elapsed, receiving a multiplicity of divided data blocks stored in a nonvolatile memory of another authentication device, assembling the divided data blocks stored in the local nonvolatile memory with the received divided data blocks to reconstitute second authentication data; cross-checking the first authentication data against the second authentication data and deciding whether the other authentication device is a legitimate device; in the event that the other authentication device is a legitimate device, one authentication device among the multiplicity of authentication devices re-divides the second authentication data into a multiplicity of divided data blocks; storing the divided data obtained by re-dividing the second authentication data in a nonvolatile memory of a multiplicity of other authentication devices; and at prescribed intervals, verifying that the other authentication device is a legitimate device by means of repeating of process of reconstituting the authentication data from the divided data, cross-checking the reconstituted authentication data against the first authentication data and deciding whether the other authentication device is a legitimate device, and in the event that the other authentication device is a legitimate device, an authentication device different from the first authentication device re-divides the authentication data cross-checked with the first authentication data into a multiplicity of divided data blocks and stores these in the nonvolatile memory of a multiplicity of authentication devices.

According to the device authentication method for use in an authentication device pertaining to the present invention, authentication devices are verified by means of verifying authentication data at prescribed intervals, so that in the event that an authentication device is replaced between prescribed intervals, the fact that the authentication device has been replaced can be detected. Consequently, it is possible to deter or prevent authentication by unauthorized means.

It is possible for the present invention to be reduced to practice in various embodiments besides an authentication device, such as an authentication system including a plurality of authentication devices, a method of operating an authentication system, or the like.

BRIEF DESCRIPTION OF THE DRAWINGS

Preferred embodiments of the present invention will now be described in conjunction with the accompanying drawings, in which:

FIG. 3 is an illustration depicting a divided data distribution management information file;

DESCRIPTION OF THE PREFERRED EMBODIMENTS

Figure 1:
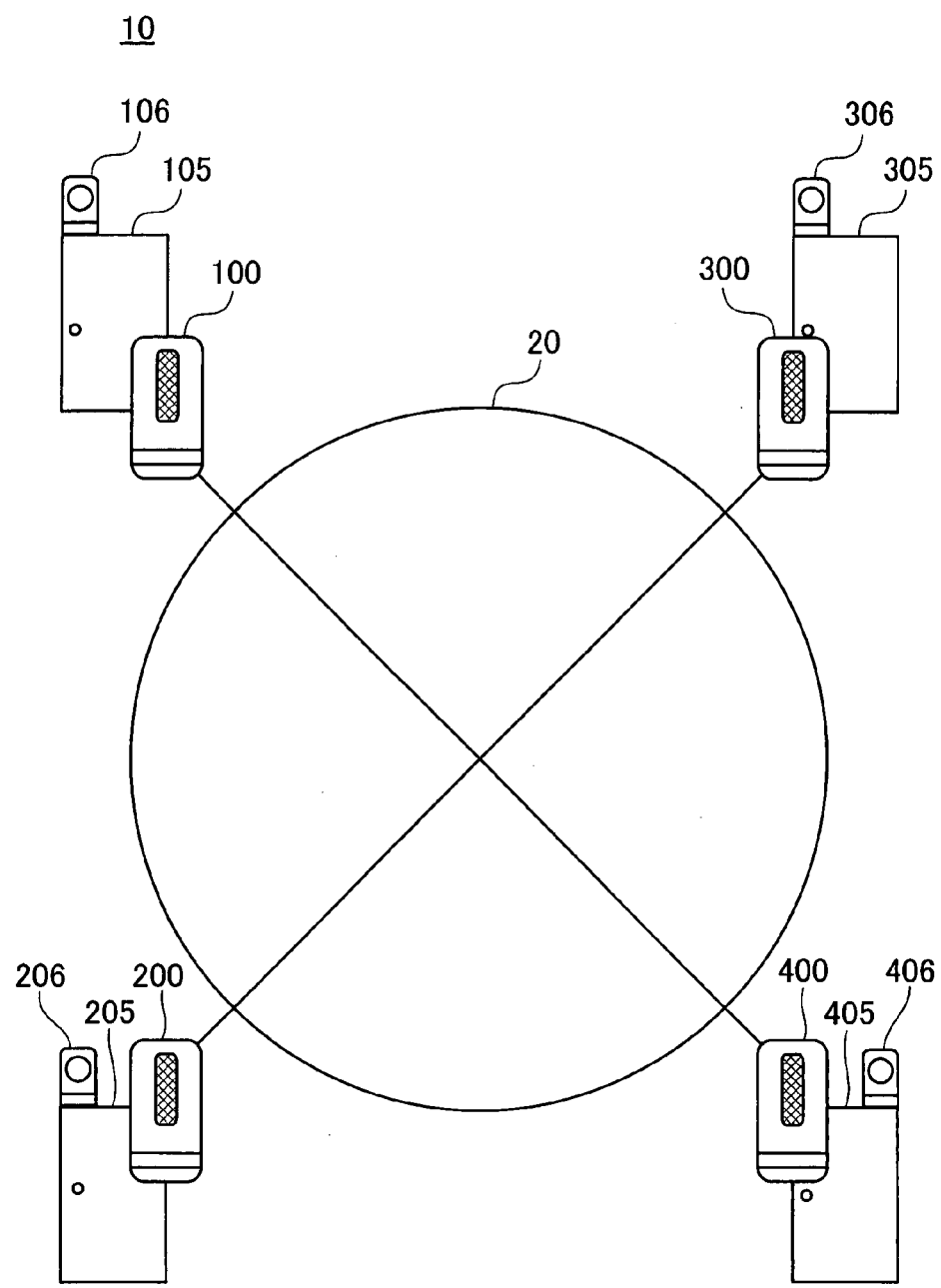
FIG. 1 is an illustration depicting an authentication system pertaining to an embodiment.

A. Configuration of the Authentication System 10 Pertaining to the Embodiment The authentication system 10 pertaining to the present embodiment will be discussed using FIG. 1. FIG. 1 is an illustration depicting an authentication system 10 pertaining to the present embodiment. The authentication system 100 is composed of four authentication devices 100, 200, 300, 400. Each of the authentication devices 100, 200, 300, 400 is connected to a network 20. Security doors 105, 205, 305, 405 are connected respectively to the authentication devices 100, 200, 300, 400. The security doors 105, 205, 305, 405 are doors that separate the inside of a security area (e.g. indoors) from the outside of a security area (e.g. outdoors). When, for example, the authentication device 100 executes an authentication process and permission to enter is given, the security door 105 will be unlocked allowing entry into the security area. Warning lights 106, 206, 306, 406 are connected respectively to the security doors 105, 205, 305, 405. When an authentication device has experienced a problem, the warning light illuminates to warn that a problem has occurred.

Figure 2:
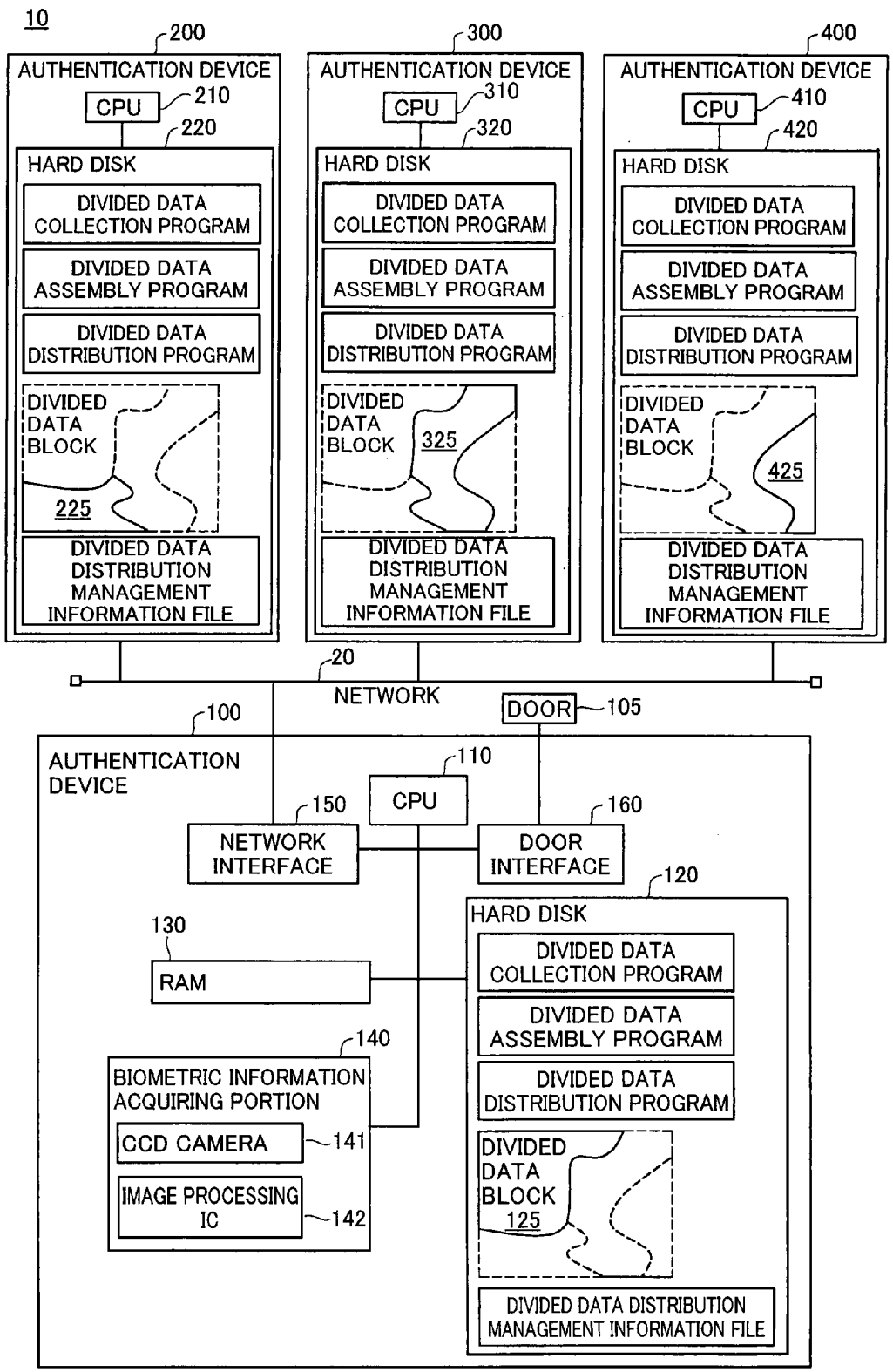
FIG. 2 is an illustration depicting the configuration of an authentication device of the authentication system.

B. Configuration of the Authentication Device 100 of the Authentication System 10 in the Embodiment The configuration of the authentication device 100 of the authentication system 10 in the present embodiment will be discussed using FIG. 2. FIG. 2 is an illustration depicting the configuration of the authentication device 100 of the authentication system 10.

The authentication system 100 includes four authentication devices 100, 200, 300, 400. The authentication devices are divided into a distributor device that distributes data to other authentication devices, and other authentication devices that receive the distributed data. No particular device is fixed as the distributor device; any one authentication device from among the four authentication devices may be designated at random, with the remaining authentication devices designated as the other authentication devices. Consequently, the configurations of the distributor device and of the other authentication devices are the same. In the discussion herein below, the authentication device 100 will be described by way of example.

The authentication device 100 has a CPU 110, a hard disk 120, a RAM 130, a biometric information acquiring portion 140, a network interface 150, and a door interface 160.

The CPU 110 is the center of the authentication device 100; not only controls all operations of the authentication device 100, but also performs various math operations and authentication operations, and on the basis of authentication results controls the door interface 160, and locks/unlocks the security door 105. The CPU 110 also carries out communication with the other authentication devices 200, 300, 400 via the network interface 150, and receives divided data blocks 225, 325, 425 that have been stored on the respective hard disks 220, 320, 420.

The hard disk 120 is a fixed storage device that stores the OS (not shown), as well as data and applications. The stored data includes a divided data block and a divided data distribution management information file. The divided data is data resulting from division into multiple blocks of authentication data for the purpose of authentication through cross-checking against input data input to the authentication device. One of these divided data blocks 125 is stored on the hard disk 120. The remaining divided data blocks 225, 235, 425 are stored respectively on the hard disks 220, 320, 420 of the authentication devices 200, 300, 400. The authentication data includes pattern data produced by digitizing digital vein blood vessel patterns, processing data produced by digitizing an algorithm and a library that are used for the purpose of comparing pattern data with input data.

The divided data distribution management information file will now be described making reference to FIG. 3. FIG. 3 is an illustration depicting the divided data distribution management information file. The divided data distribution management information file is a file used for managing distribution of the divided data blocks, and records the distributor device number, the authentication device distribution status ("Completed" or "Not Completed"), and the authentication device assembly status ("Completed" or "Not Completed"). Once the CPU of the distributor device that executes distribution has distributed the divided data blocks to the authentication devices, the authentication device distribution status is rewritten from "Not Completed" to "Completed." Consequently, distribution status for authentication devices except for the distributor device remains "Not Completed." Once assembly of the divided data blocks that were distributed to the authentication devices has been executed and the authentication data has been reconstituted, the CPU 110 is notified to that effect by the authentication devices and rewrites the authentication device assembly status from "Not Completed" to "Completed."

Applications stored on the hard disk 120 include a divided data collection program for collecting divided data blocks stored on the other authentication devices 200, 300, 400; a divided data assembly program for assembling the collected divided data blocks; and a divided data distribution program for re-dividing the assembled divided data blocks and distributing them to the other authentication devices 200, 300, 400, when an authentication device has assumed the role of distributor device.

The RAM 130 is a rewritable volatile memory. The OS and applications of the authentication device 200 which are stored on the hard disk 120 are copied into the RAM 130 and executed in the RAM 130. The RAM 130 also temporarily stores assembled data which has been reconstituted by assembling the divided data blocks collected by the authentication device 100 from the other authentication devices 200, 300, 400. This assembled data may be initial assembled data resulting from assembling the divided data blocks at startup of the authentication device 100, or assembled data at device verification resulting from assembling the divided data blocks when an authentication device is verified at a point in time subsequent to startup.

The biometric information acquiring portion 140 acquires a digital vein blood vessel pattern by means of a camera 141 and an image processor IC 142. For example, an individual requesting authentication places a finger on a measurement stage (not shown), and the finger is illuminated with near infrared (about 760 nm) from a near infrared light source (not shown) located in the upper part of the measurement stage. The reduced hemoglobin of the red blood cells in the veins absorbs light of near infrared wavelength. When the transmitted light is imaged by the camera 141, the area of the veins will appear dark. The CPU 110 is thereby able to acquire an image of the digital vein blood vessel pattern. The acquired digital vein blood vessel pattern undergoes image processing by the image processor IC 142 to create input data for authentication.

The network interface 150 is an interface for carrying out communication with the other authentication devices 200, 300, 400. The door interface 160 controls locking/unlocking of the security door 105.

The other authentication devices 200, 300, 400, like the authentication device 100, have a CPU 210, 310, 410 and a hard disk 220, 320, 420. Here, the divided data blocks stored on the hard disks 220, 320, 420 are the divided data blocks 225, 325, 425; these divided data blocks respectively differ from the divided data block 125 stored on the hard disk 120 of the authentication device 100. When assembled, the divided data blocks 125, 225, 325, 425 constitute the authentication data. Divided data distribution management information files are stored on the hard disks 220, 320, 420 in addition to the hard disk 120.

Figure 4:
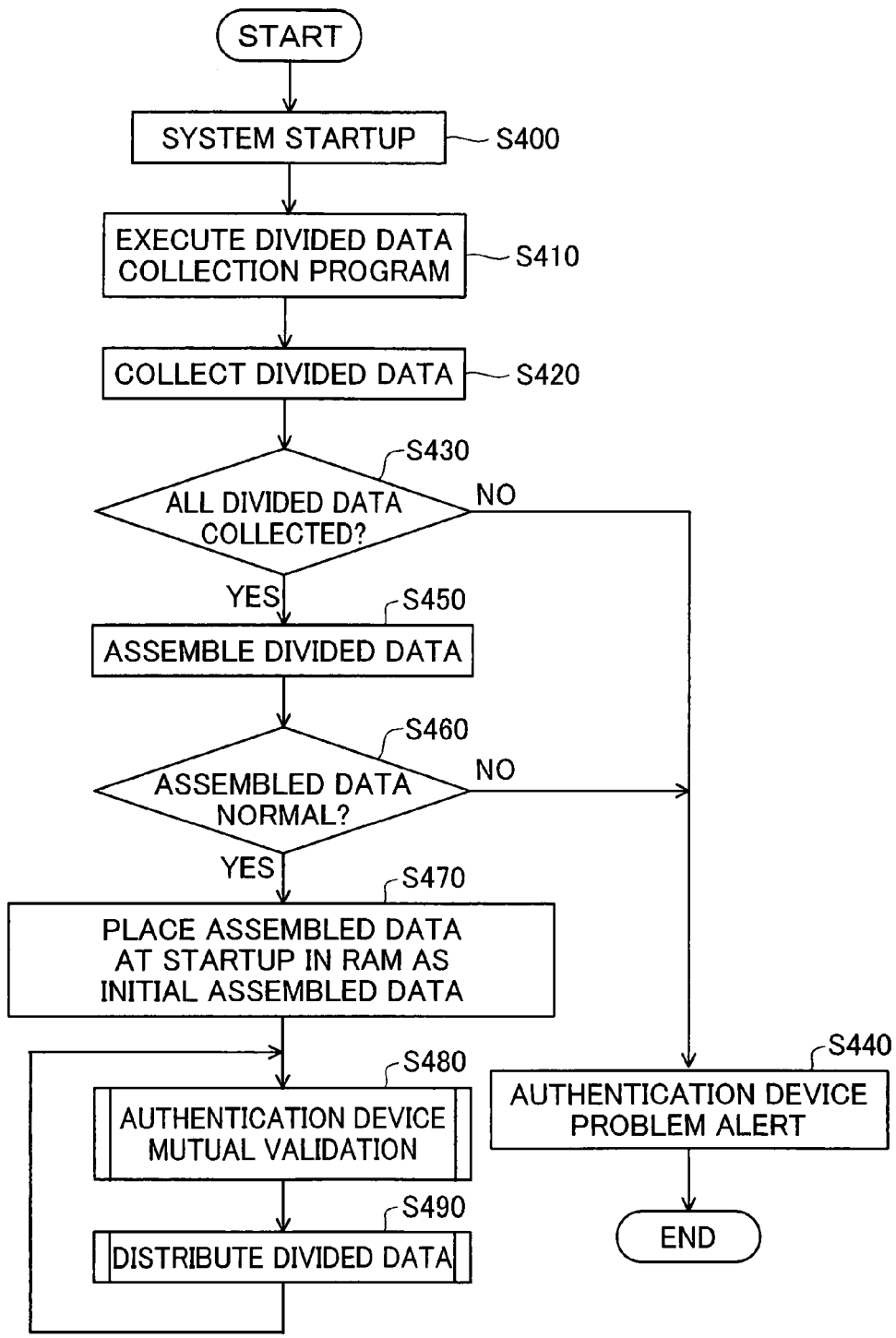
FIG. 4 is a flowchart depicting the process from startup of the authentication device.
Figure 5:
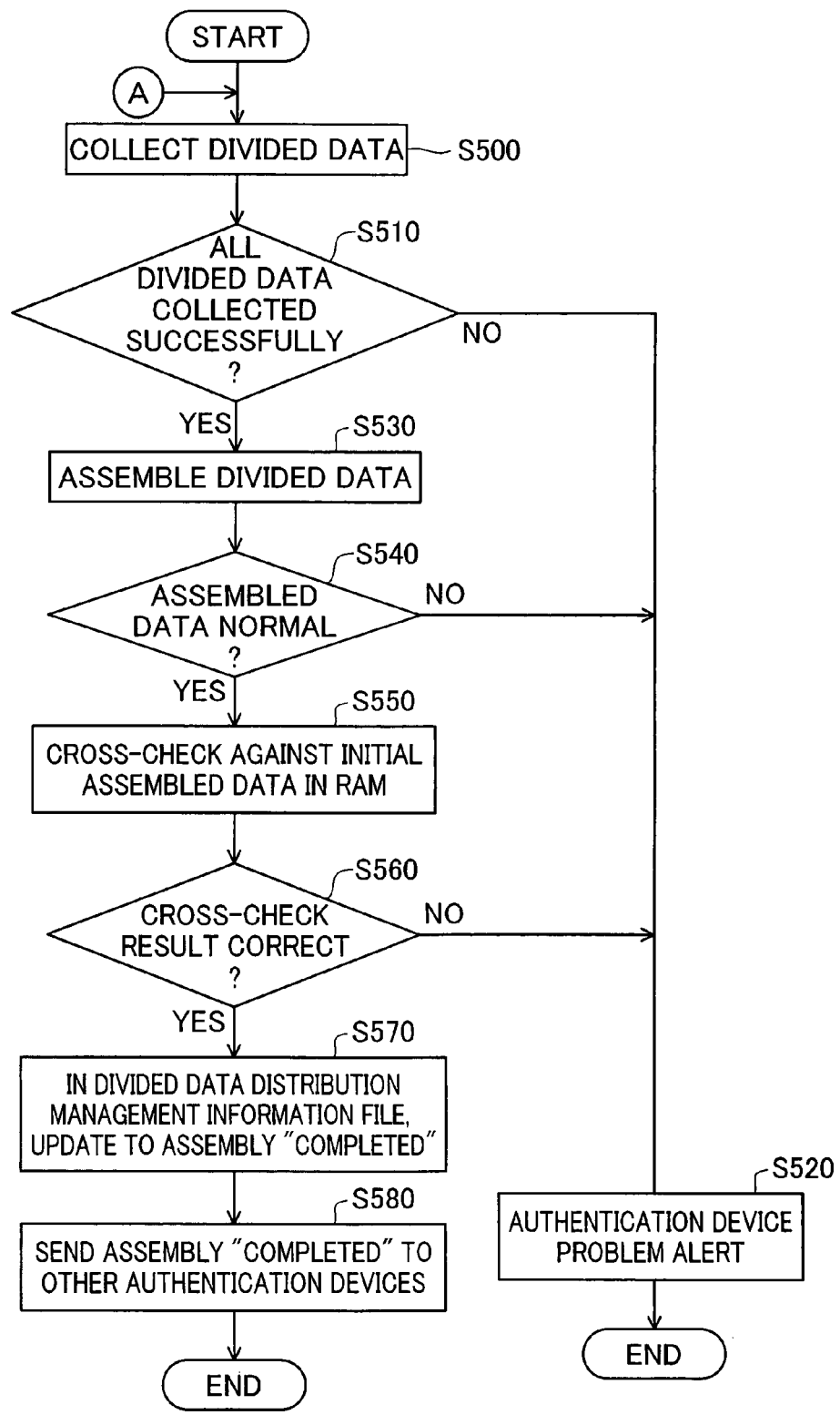
FIG. 5 is a flowchart depicting a mutual verification process executed by the authentication device.
Figure 6:
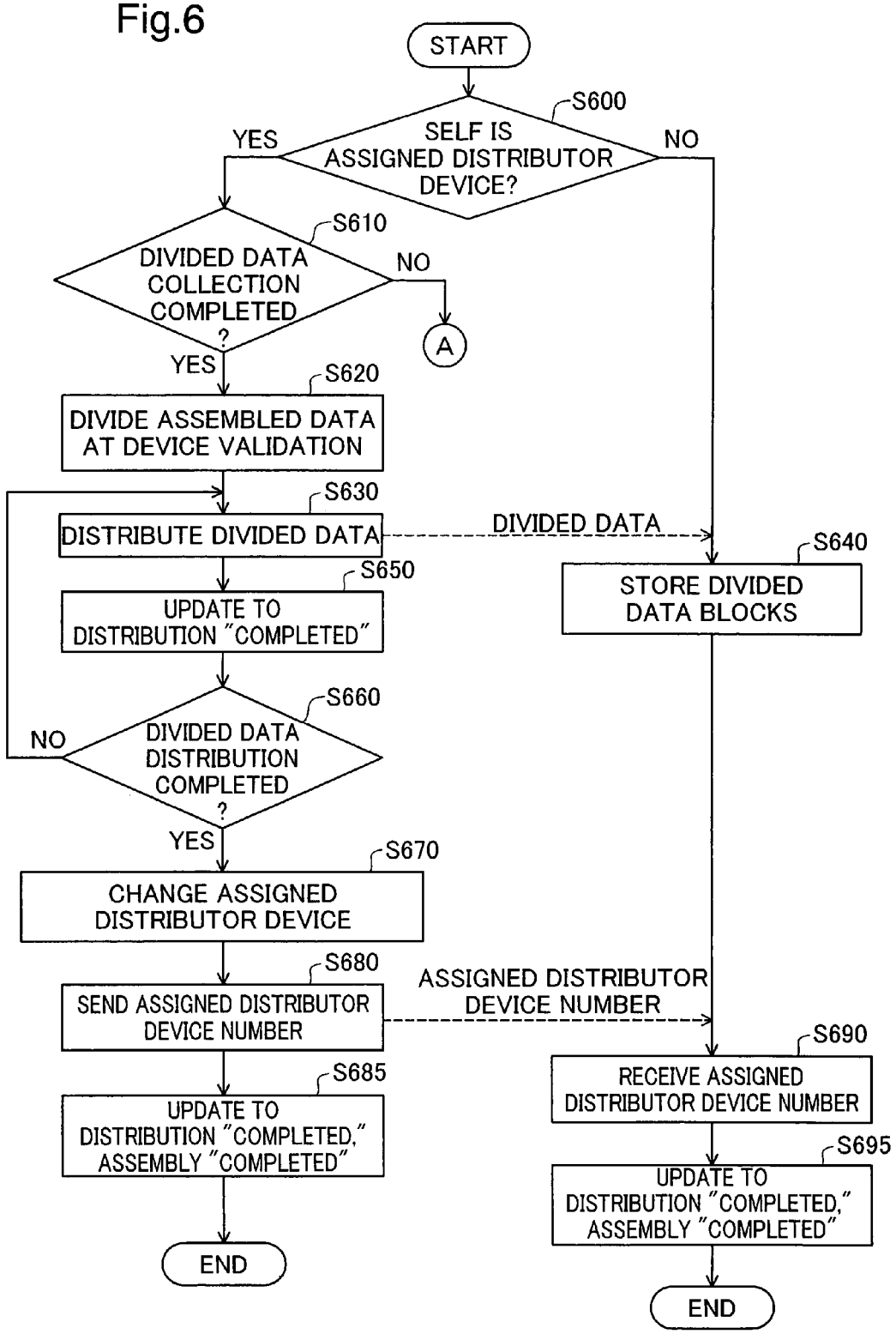
FIG. 6 is a flowchart depicting a data division/distribution process executed by the authentication device.
Figure 7:
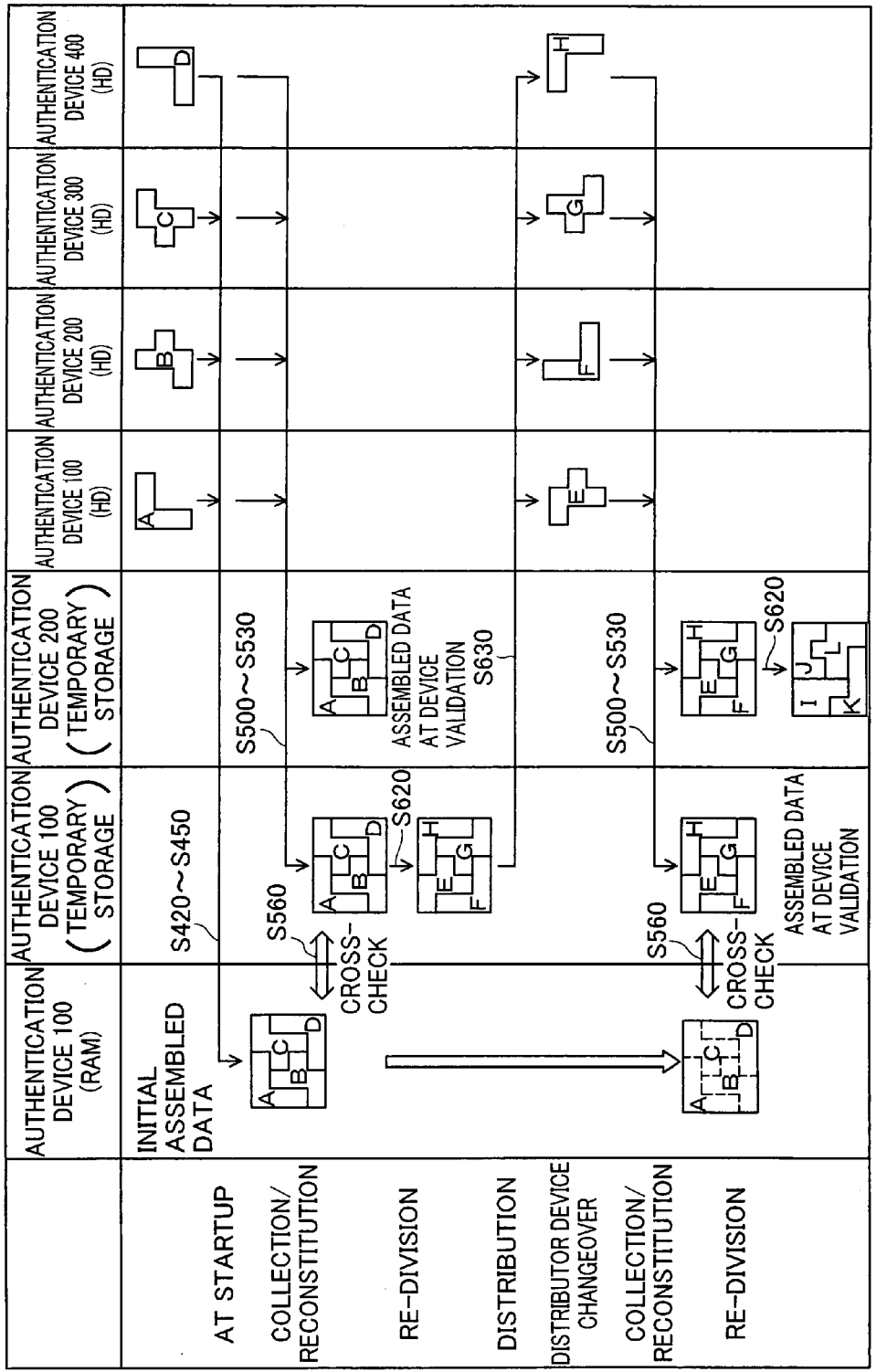
FIG. 7 is an illustration depicting an overview of divided data and assembled data stored on a hard disk and in RAM in each stage of the authentication operation.

C. Operation of the Authentication System 10 Pertaining to the Embodiment The operation of the authentication device 100 of the authentication system 10 in the present embodiment will be discussed making reference to FIGS. 4 to 7. FIG. 4 is a flowchart depicting the process from startup of the authentication device 100. FIG. 5 is a flowchart depicting a mutual verification process executed by the authentication device 100. FIG. 6 is a flowchart depicting a data division/distribution process executed by the authentication device 100. FIG. 7 is an illustration depicting an overview of divided data and assembled data stored on a hard disk and in RAM in each stage of the authentication operation. While the flow depicted in FIGS. 4 to 6 will be described here taking the example of the authentication device 100, the flow depicted in FIGS. 4 to 6 is executed respectively for the other authentication devices 200, 300, 400 as well.

When switched on, the authentication device 100 starts up (Step S400). The CPU 110 of the authentication device 100 copies the divided data collection program from the hard disk 120 to the RAM 130, executes the divided data collection program (Step S410), and collects the divided data blocks from the other authentication devices 200, 300, 400 (Step S420). In FIG. 7, the divided data blocks A, B, C, D are temporarily stored in the RAM 130 of the authentication device 100.

The CPU 110 decides whether the divided data blocks have been collected from all of the authentication devices (Step S430). For example, the CPU 110 may set a flag for each authentication device prior to execution of the collection program, and then each time that a divided data block is successfully collected from an authentication device, clear the flag for the device. In the event that all of the flags cannot be cleared within a prescribed time interval, the CPU 110 can decide that divided data could not be collected. In the event that divided data could not be collected (Step S430, No), the CPU 110 issues an alert indicating a problem in an authentication device (Step S440).

The CPU 110 merges the collected divided data blocks (Step S450). The divided data blocks are two-dimensional data sequences, with each data sequence having a different shape. The divided data blocks have a shape parameter that determines shape, with the positional relationships of the divided data blocks A, B, C, D being determined on the basis of the shape parameter; the divided data blocks A, B, C, D are assembled as shown in FIG. 7. The CPU 110 then decides whether the assembled data is normal (Step S460). The CPU 110 may decide whether the assembled data is normal by using a check sum of the assembled data, for example. Alternatively, the CPU 110 may decide whether the assembled data is normal by comparing a hash value of the assembled data with the hash value when the authentication data was initially registered in the authentication system. In the event that the CPU 110 decides that the assembled data is not normal (Step S460, No), it issues an alert indicating a problem in one of the authentication devices (Step S440).

In the event that the CPU 110 decides that the assembled data is normal (Step S460, Yes), the assembled data is stored as the initial assembled data in the RAM 130 (Step S470). The initial assembled data is used as initial data for mutual verification between authentication devices, or as authentication data for cross-checking input data during authentication. The CPU 110 executes an authentication device mutual verification sub-routine (Step S480). The authentication device mutual verification sub-routine will be discussed in detail below with reference to FIG. 5.

The authentication device mutual verification sub-routine is a process executed a prescribed time interval after the initial assembled data has been placed in the RAM 130 by the CPU 110.

The CPU 110 executes the collection program and collects the divided data blocks from the other authentication devices 200, 300, 400 (Step S500). The CPU 110 then decides whether all of the divided data blocks were successfully collected from the other authentication devices 200, 300, 400 (Step S510). As mentioned above, the CPU 110 sets a flag for each authentication device prior to execution of the collection program, and then each time that a divided data block is successfully collected from an authentication device, clears the flag for the device. In the event that all of the flags were not cleared within a prescribed time interval, the CPU 110 can decide that divided data could not be collected. In the event that divided data could not be collected (Step S510, No), the CPU 110 issues an alert indicating that a problem has occurred in an authentication device (Step S520).

In the event that the CPU 110 has successfully collected all of the divided data blocks (Step S510, Yes), CPU 110 assembles the divided data and reconstitutes the authentication data (Step S530). Specifically, the divided data blocks A, B, C, D are assembled as shown in FIG. 7. The CPU 110 then decides whether the assembled data is normal (Step S540). The CPU 110 may decide whether the assembled data is normal by using a check sum of the assembled data, for example. Alternatively, the CPU 110 may decide whether the assembled data is normal by comparing a hash value of the assembled data with the hash value when the authentication data was initially registered in the authentication system. In the event that the CPU 110 decides that the assembled data is not normal (Step S540, No), it issues an alert indicating that a problem has occurred in one of the authentication devices (Step S520).

In the event that the CPU 110 decides that the assembled data is normal (Step S540, Yes), the assembled data is designed as the assembled data at device verification, and a cross-check with the initial assembled data is performed (Step S550). If as a result of the cross-check the initial assembled data and the assembled data at device verification do not match (Step S560, No), the CPU 110 issues an alert that a problem has occurred in one of the authentication devices (Step S520). Unless replacement of an authentication device or something similar has occurred, the initial assembled data and the assembled data at device verification will match.

In the event that the initial assembled data and the assembled data at device verification match (Step S560, Yes), the "authentication device 100 assembly status" field in the divided data distribution management information file is updated to "Completed" (Step S570).

In the event that the CPU 110 has updated the "authentication device 100 assembly status" to "Completed," notification to that effect will be sent to the other authentication devices 200, 300, 400 (Step S580). Consequently, in the event that, for example, the CPU 210 of the authentication device 200 has updated to "Completed" status the "authentication device 200 assembly status" field of the divided data distribution management information file on the hard disk 220, notification to the effect that the CPU 210 of the authentication device 200 has updated to "Completed" status the "authentication device 200 assembly status" field of the divided data distribution management information file on the hard disk 220 will be sent to the authentication device 100. Upon receiving notification to the effect that the CPU 210 of the authentication device 200 has updated to "Completed" status the "authentication device 200 assembly status" field of the divided data distribution management information file on the hard disk 220, the CPU 110 will update to "Completed" status the "authentication device 200 assembly status" field of the divided data distribution management information file on the hard disk 120 of the authentication device 100.

The CPU 110 completes the authentication device mutual verification sub-routine (Step S480) and executes a data division/distribution sub-routine (Step S490). The data division/distribution sub-routine will be described in detail below with reference to FIG. 6.

First, the CPU 110 decides whether the authentication device 100 is the assigned distributor device (Step S600). This is because the subsequent process will differ depending on whether the device is the assigned distributor device. The decision as to whether the device is the assigned distributor device is made on the basis of the distributor device number recorded in the "distributor device number" field of the divided data distribution management information file. Specifically, when the distributor device number recorded in the "distributor device number" field is the device number of the local authentication device 100, the CPU 110 decides that the local device is the assigned distributor device, or when it is the number of another authentication device, for example the authentication device 200, decides that the local device is not the assigned distributor device.

In the event that the authentication device 100 is the assigned distributor device (Step S600, Yes), the CPU 110 decides whether collection of the divided data has been completed (Step S610). The CPU 110 makes the decision as to whether collection of the divided data has been completed, for example, on the basis of whether assembled data at device verification is present in the RAM 130. The CPU 110 may also decide based on whether the "authentication device 100 assembly status" field of the divided data distribution management information file has been updated to "Completed" status. In the event that collection of the divided data has not been completed (Step S610, No), the CPU 110 returns to authentication device mutual verification step (Step S480).

In the event that collection of the divided data has been completed (Step S610, Yes), the CPU 110 again divides the assembled data at device verification (Step S620). As shown in FIG. 7, at this time the CPU 110 divides the data into divided data (divided data blocks E, F, G, H) different than the collected divided data (divided data blocks A, B, C, D). For example, the CPU 110 arrays the assembled data at device verification in a two-dimensional array and divides it fourths by means of a random number. The CPU 110 then distributes the divided data (divided data blocks F, G, H) to the other authentication devices 200, 300, 400 (Step S630). One of the divided data blocks (divided data block E) is not distributed by the CPU 110 to the other authentication devices 200, 300, 400, but is instead stored on the hard disk 120. When the CPUs 210, 310, 410 of the other authentication devices 200, 300, 400 receive the distributed divided data blocks, they store the divided data blocks on their respective hard disks 220, 320, 420 (Step S640).

Once the CPU 110 has distributed divided data, the CPU 110 updates the "authentication device distribution status" field of the divided data distribution management information file from "Not Completed" to "Completed" status (Step S650). For example, in the event that the CPU 110 has distributed divided data to the authentication device 200, the CPU 110 updates the "authentication device 200 distribution status" field from "Not Completed" to "Completed" status. The CPU 110 repeatedly performs distribution of the divided data (Step S630) and updating of the "authentication device 200 distribution status" field from "Not Completed" to "Completed" status (Step S650) until the CPU 110 has distributed divided data to all of the authentication devices (Step S660, No).

Once the CPU 110 has updated all of the "authentication device distribution status" fields to "Completed" status, the CPU 110 terminates distribution of divided data to the authentication devices (Step S660, Yes), and executes reassignment of the assigned distributor device (Step S670). Specifically, from among all of the authentication devices the CPU 110 selects an assigned distributor device for executing the next distribution. The assigned distributor device for executing the next distribution is selected by means of a random number, for example. Consequently, it is possible for the same authentication device to be successively assigned the role of distributor device. In the example shown in FIG. 7, the initial assigned distributor device is the authentication device 100, but the second assigned distributor device is the authentication device 200.

In the event that the CPU 110 has selected the assigned distributor device for executing the next distribution, the CPU 110 sends the device number of that device as the assigned distributor device number to the other authentication devices (Step S680), and updates all of the "authentication device distribution status" and "authentication device assembly status" fields of the divided data distribution management information file from "Completed" to "Not Completed" status.

When the CPUs 210, 310, 410 of the other authentication devices 200, 300, 400 receive the assigned distributor device number (Step S690), they update the "distributor device number" field of the divided data distribution management information file, as well as updating the "authentication device distribution status" and "authentication device assembly status" fields of the divided data distribution management information file from "Completed" to "Not Completed" status (Step S695).

Subsequently, the CPU 110 repeatedly executes the authentication device mutual verification sub-routine (Step S480) and the data division/distribution sub-routine (Step S490). Here, in the event that the assembled data at device verification is being re-divided (Step S620), it will be divided into different divided data blocks each time. For example, in the example depicted in FIG. 7, the data at device verification is re-divided into divided data blocks E, F, G, H during the first re-division, and during the second re-division the divided data is re-divided into divided data blocks I, J, K, L. As mentioned earlier, the CPU 110 can re-divide the divided data in to different blocks each time by arraying the data at device verification in a two-dimensional array and dividing it fourths by means of a random number. After re-division/distribution has been carried out, in the event that divided data collected from a given authentication device consists of the divided data prior to the re-division, when the CPU assembles the divided data, the check sum of the assembled data will not match. Consequently, the CPU can detect if a problem has occurred on any of the authentication devices.

In the present embodiment, no particular duration is specified for the interval between execution of the authentication device verification sub-routine (Step S480) and execution of the data division/distribution sub-routine (Step S490); however, the data division/distribution sub-routine is executed immediately after execution of the authentication device verification sub-routine. In the authentication device verification sub-routine the CPU 110 creates assembled data at device verification from the divided data, and this assembled data at device verification can be used in the data division/distribution sub-routine immediately following. If there is a long interval between execution of the authentication device verification sub-routine and execution of the data division/distribution sub-routine, it is possible that an authentication device could be replaced during this interval. In such a case, a re-divided divided data block will be sent to the replaced authentication device, and therefore the divided data block collected in the next authentication device verification sub-routine will be the correct divided data block. As a result, there is risk that replacement of the authentication device will go undetected. Accordingly, the interval between execution of the authentication device verification sub-routine and execution of the data division/distribution sub-routine is made as short as possible.

Figure 8:
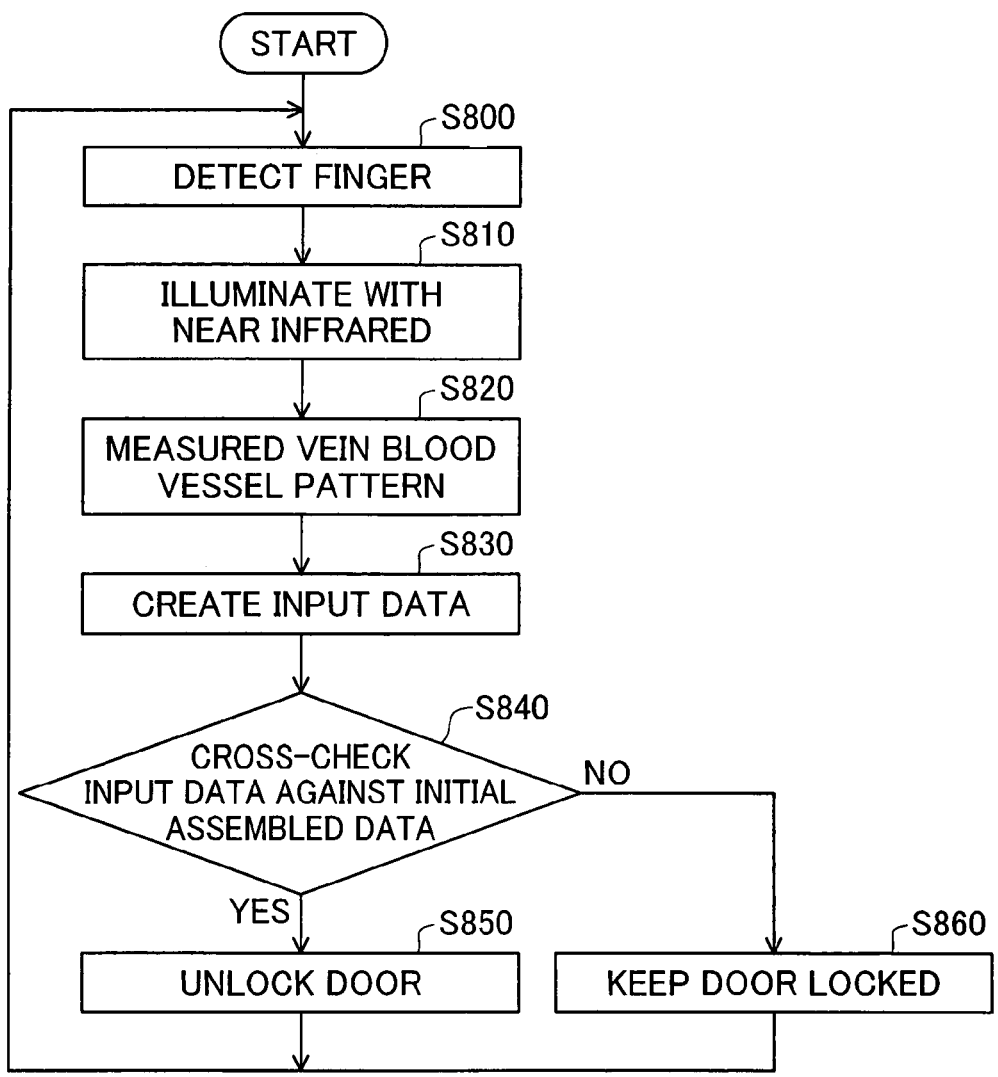
FIG. 8 is a flowchart depicting the process of executing authentication.

Operation in the case of execution of authentication will be described with reference to FIG. 8. FIG. 8 is a flowchart depicting the process of executing authentication.

When a finger of an individual requesting authentication is placed on a measurement stage (not shown) and placement of the finger is detected by a sensor (not shown) (Step S800), the finger is illuminated with near infrared (about 760 nm) from a near infrared light source (not shown) located in the upper part of the measurement stage (Step S810). The reduced hemoglobin of the red blood cells in the veins absorbs light of near infrared wavelength. When the CPU 110 captures the transmitted light with the camera 141, the area of the veins will appear dark. The CPU 110 is thereby measures an image of the digital vein blood vessel pattern (Step S820). Using the image processor IC 142, the CPU 110 executes image processing of the measured image of the digital vein blood vessel pattern, to create input data for authentication (Step S830).

Next, the CPU 110 cross-checks the created input data for authentication against the initial assembled data stored in the RAM 130, and executes authentication (Step S840). As noted above, the initial assembled data has been assembled and reconstituted at the time of startup of the authentication device 100. When executing the authentication operation, or when executing the authentication device verification and data division/distribution operations, the CPU 110 simply reads the initial assembled data and does not update it. Consequently, even in circumstances in which the authentication operation and the aforementioned authentication device verification and data division/distribution operations must be executed simultaneously, the CPU 110 can execute the authentication operation and the aforementioned authentication device verification and data division/distribution operations independently of one another. In the event that an authentication device has encountered a problem in the authentication device verification sub-routine (Step S490), the CPU 110 will issue an alert; it could also suspend the authentication operation at the same time.

In the event that the created input data for authentication and the initial assembled data held in the RAM 130 match (Step S840, Yes), permission is given to unlock the security door 105 and enter. If on the other hand the created input data for authentication and the initial assembled data stored in the RAM 130 do not match (Step S840, No), the security door 105 will remain locked.

As mentioned previously, according to the present embodiment, only one (e.g. divided data block A) of a plurality of divided data blocks into which the authentication data has been divided is stored on the hard disk of the authentication device 100, and non-divided authentication data is not stored on the hard disk 120. Consequently, even if the authentication device 100 should be stolen for example, reconstituting the authentication data (assembled data) will be difficult.

According to the present embodiment, the reconstituted authentication data is stored in volatile memory means. If power is cut to the authentication device 100, the reconstituted authentication data will be lost. Thus, if, for example, the authentication device should be stolen, the data will be lost, making it difficult to reconstitute the authentication data. Consequently, it is possible to deter or prevent unauthorized authentication using authentication data faking.

According to the present embodiment, the assembled data is cross-checked at two different time periods. In the event that the authentication device has been replaced between these two time periods, the assembled data will not match. Consequently, it is possible to detect a problem such as replacement of an authentication device, and to issue an alert. That is, improper authentication through authentication device replacement can be deterred or prevented.

According to the present embodiment, since initial assembled data at time of startup of the authentication device is used as the assembled data, it is possible to detect authentication device replacement occurring at some point in time subsequent to startup of the authentication device. Consequently, improper authentication through authentication device replacement after startup can be deterred or prevented.

According to the present embodiment, since the assembled data is divided into different divided data blocks for distribution each time, the divided data blocks received from the authentication device which is the assigned distributor device will be different each time. Consequently, even if divided data blocks are stolen or intercepted at any given point in time, in the event that the divided data blocks are subsequently re-divided and re-distributed, it will no longer be possible to reconstitute the assembled data using the stolen or intercepted divided data once the authentication data has been re-divided and redistributed. Consequently, even in the event that divided data is stolen or intercepted, it will be possible to detect authentication device replacement and to deter or prevent improper authentication through authentication device replacement.

According to the present embodiment, the assigned distributor device which performs division of the authentication data and distribution of the divided data differs each time, making it difficult to target the assigned distributor device which performs division of the authentication data and distribution of the divided data for hacking.

According to the present invention, the initial assembled data for cross-checking with input data or assembled data at device verification is not updated after it has been created at startup. Consequently, the CPU 110 can execute authentication operations and authentication device verification operations independently of one another.

D. Modified Examples (1) In the preceding embodiment, authentication devices were described by way of example, but it is possible for the present invention to be reduced to practice in various ways, for example, in an embodiment such as an authentication system that includes a multiplicity of authentication devices.

(2) In the preceding embodiment, the changeover of the assigned distributor device takes place after division and distribution of the assembled data and before collection of the divided data and authentication device verification; however, it could instead take place after collection of the divided data and authentication device verification, and before division and distribution of the assembled data.

(3) In the preceding embodiment, the CPU of the assigned distributor device divides the assembled data into different divided data blocks each time, but could instead divide the data so that some of the data is duplicated across divided data blocks at that time.

(4) In the preceding embodiment, collection of divided data is executed at startup, but initial collection of divided data could instead be executed after prescribed period of time subsequent to startup. This is because in some instances, the authentication devices may not have started up.

(5) In the authentication device verification process, in the event that, for example, an authentication device cannot be verified due to authentication device replacement or the like, the authentication system may be shut down, rather than issuing an alert.

(6) In the preceding embodiment, when divided data is transferred among authentication devices, the divided data is transferred as-is; however, the divided data could also be encrypted for transfer. For example, a public key encryption format or private key encryption format could be employed.

(7) In the preceding embodiment, the divided data was arrayed in a two-dimensional data sequence, but a one-dimensional data sequence would be acceptable as well. In the case of a one-dimensional data sequence, the CPU can simply assemble the divided data blocks by lining them up according to the divided data block sequence.

While the present invention has been shown hereinabove through certain preferred embodiments, the embodiments of the invention set forth herein are intended merely to aid understanding of the invention and should in no wise be construed as limiting thereof. Various modifications and improvements to the invention are possible without departing from the spirit thereof as set forth in the appended claims and shall be considered to fall within the scope of equivalents of the present invention.

What is claimed is:

1. An authentication device in an authentication system including a plurality of authentication devices, the authentication device comprising:
   a nonvolatile memory configured to store one of a plurality of divided data blocks obtained by dividing into multiple data blocks authentication data which has been prepared in advance for executing authentication through cross-checking against input data input to the authentication device;
   a receiver configured to receive a divided data block stored in another authentication device;
   a reconstituting module that assembles the divided data block stored in the nonvolatile memory to the received divided data block and reconstitutes the authentication data;
   a volatile memory configured to store the reconstituted authentication data;
   an authentication module that authenticates by cross-checking the reconstituted authentication data against the input data input to the authentication device at the time of authentication;
   a dividing module that re-divides the reconstituted authentication data into divided data blocks different from the divided data blocks prior to reconstitution; and
   a distributor portion configured to distribute the re-divided data blocks to other authentication devices, wherein:
   no non-divided authentication data is stored in any authentication device in the authentication system, and
   the authentication device further comprises:
   a cross-checking module that cross-checks first authentication data reconstituted by the reconstituting module during a first time period and stored in the nonvolatile memory, against second authentication data reconstituted by the reconstituting module during a second time period subsequent to the first time period, the first time period being a startup time of the authentication device; and
   an alarm configured to issue an alert in the event that the first authentication data and the second authentication data do not match with each other.

2. The authentication device according to claim 1 further comprising:
   a division/distribution device designating module that designates another authentication device from among a plurality of other authentication devices, to be assigned the task of dividing authentication data and distributing the divided data blocks; and
   a transmitter configured to transmit to other authentication devices a code indicating the designated authentication device.

3. An authentication system including a plurality of authentication devices, wherein each authentication device comprises:
   a nonvolatile memory configured to store one of a plurality of divided data blocks obtained by dividing into multiple data blocks authentication data which has been prepared in advance for executing authentication through cross-checking against input data input to the authentication device;
   a receiver configured to receive a divided data block stored in another authentication device;
   a reconstituting module that assembles the divided data block stored in the nonvolatile memory to the received divided data block and reconstitutes the authentication data;
   a volatile memory configured to store the reconstituted authentication data;
   an authentication module that authenticates by cross-checking the input data at the time of authentication against the reconstituted authentication data stored in the volatile memory;
   a cross-checking module that cross-checks first authentication data reconstituted by the reconstituting module during a first time period and stored in the nonvolatile memory, against second authentication data reconstituted by the reconstituting module during a second time period subsequent to the first time period; and
   an alarm configured to issue an alert in the event that the first authentication data and the second authentication data do not match with each other,
   wherein one of the plurality of authentication devices further comprises:
   a dividing module that divides the reconstituted authentication data into divided data blocks different from the divided data blocks prior to reconstitution;
   a distributor configured to distribute the divided data blocks so divided to other authentication devices;
   a division/distribution device designating module that designates another authentication device from the other authentication devices, to be assigned the task of dividing authentication data and distributing the divided data blocks; and
   a transmitter configured to transmit to the other authentication devices a code indicating the designated authentication device, and
   wherein no non-divided authentication data is stored in any authentication device in the authentication system.

4. A device verification method for use in an authentication device, comprising:
   at startup, receiving a plurality of divided data blocks stored in nonvolatile memories of other authentication devices;

assembling divided data blocks stored in a local nonvolatile memory with the received divided data blocks to reconstitute first authentication data;

storing the reconstituted first authentication data in a nonvolatile memory;

after a prescribed time interval has elapsed, receiving a plurality of divided data blocks stored in the nonvolatile memories of the other authentication devices;

assembling the divided data blocks stored in the local nonvolatile memory with the received divided data blocks to reconstitute second authentication data;

cross-checking the first authentication data against the second authentication data and deciding whether the other authentication devices are legitimate;

in the event that the other authentication devices are legitimate, one authentication device among a plurality of authentication devices re-divides the second authentication data into a plurality of divided data blocks;

storing the divided data blocks obtained by re-dividing the second authentication data in nonvolatile memories of the plurality of authentication devices; and at prescribed intervals, verifying that other authentication devices are legitimate by repeating of a process of reconstituting the authentication data from the divided data blocks, cross-checking the reconstituted authentication data against the first authentication data and deciding whether the other authentication devices are legitimate, and in the event that the other authentication devices are legitimate, an authentication device different from the one authentication device re-divides the authentication data cross-checked with the first authentication data into a plurality of divided data blocks and stores these in the nonvolatile memories of the plurality of authentication devices, wherein no non-divided authentication data is stored in any authentication device.

* * * * *